United States Patent
Lee et al.

(10) Patent No.: US 8,189,919 B2
(45) Date of Patent: May 29, 2012

(54) METHOD AND SYSTEM FOR CONTAINER IDENTIFICATION

(76) Inventors: Chung Mong Lee, Hong Kong (CN); Wing Kin Wong, Hong Kong (CN); Ka Yu Sin, Hong Kong (CN)

( * ) Notice: Subject to any disclaimer, the term of this patent is extended or adjusted under 35 U.S.C. 154(b) by 1187 days.

(21) Appl. No.: 11/965,720

(22) Filed: Dec. 27, 2007

(65) Prior Publication Data

US 2009/0180683 A1    Jul. 16, 2009

(51) Int. Cl.
*G06K 9/00* (2006.01)
*G06K 7/10* (2006.01)
*B65D 23/12* (2006.01)

(52) U.S. Cl. ............ 382/182; 382/142; 235/462.43; 215/395

(58) Field of Classification Search ............ 382/182, 382/156, 157, 159, 158, 190, 187, 155, 142; 220/6, 23.83, 4.01, 220; 235/487, 492, 435, 235/439, 441, 454, 472.01, 472.03, 462.01, 235/462.43, 462.44; 206/521, 583, 423; 215/395
See application file for complete search history.

(56) References Cited

U.S. PATENT DOCUMENTS

| | | | |
|---|---|---|---|
| 5,780,826 A | | 7/1998 | Hareyama et al. |
| 6,026,177 A | * | 2/2000 | Mong et al. ............ 382/156 |
| 6,339,651 B1 | * | 1/2002 | Tian et al. ............ 382/105 |
| 6,801,245 B2 | * | 10/2004 | Shniberg et al. .......... 348/169 |
| 6,931,314 B2 | | 8/2005 | Holland et al. |
| 6,998,617 B2 | | 2/2006 | D'Emilio et al. |
| 7,262,792 B2 | * | 8/2007 | Shniberg et al. .......... 348/169 |
| 2006/0153455 A1 | | 7/2006 | Takehara et al. |

FOREIGN PATENT DOCUMENTS

WO    WO-2004/058623 A1    7/2004

* cited by examiner

*Primary Examiner* — Sheela Chawan
(74) *Attorney, Agent, or Firm* — Eagle IP Limited; Jacqueline C. Lui

(57) ABSTRACT

A method and system for container identification are disclosed. The method comprises obtaining a plurality of digital images of a character sequence on the container, extracting the character sequences from the images, combining the character sequences into at least one identification code candidate, and selecting one of the candidates as the identification code. The system comprises at least one camera and a computer system that is electrically coupled to the camera, whereby when the computer system receives a trigger signal, said computer system takes a plurality of digital images from the camera, produces character sequences as partial recognition results for the plurality of digital images, and combines the partial recognition results together to produce the identification code.

6 Claims, 11 Drawing Sheets

METHOD AND SYSTEM FOR CONTAINER IDENTIFICATION

FIELD OF INVENTION

The present invention relates to a system and method for recognizing identification code and, in particular, a system and method for recognizing the code from digital images.

BACKGROUND OF INVENTION

There is an increasing commercial importance for systems that are capable of automatically identifying cargo containers or vehicle license plates. Container code, as a standard marking on the container, is a unique identification code that appears on several places in a container. Similarly, the vehicle license plate also uniquely identifies a vehicle. In recent years, computer vision technology has been developed to provide a cost-effective solution in reading this alphanumeric code. In this scenario, cameras are used to take an image that contains the identification code. Then image processing and optical character recognition (OCR) technologies are used to recognize the container code. Due to dirt or other uncontrollable circumstances, the container code or vehicle license number may not be clearly captured in a digital image. An example situation is that the object (the container or vehicle) is moving relative to the camera when the image is captured, so the characters are smeared in one or more direction. Another example is that the lighting conditions make the characters indistinguishable fro the background. In such cases, the recognition accuracy suffers.

SUMMARY OF INVENTION

A need therefore exists to improve the recognition performance.

An exemplary embodiment is a method to identify an identification code. The method comprises obtaining a plurality of digital images that include the identification code from an object and extracting a character sequence from each of the plurality of digital images, with each character in the character sequence having a confidence score. It also comprises combining character sequences obtained from different digital images to form at least one identification code candidate, and selecting the identification code candidate that satisfies a pre-determined criterion as the identification code of the object.

In one embodiment, the combination step of this method composes at least one sequence pair wherein a first sequence is one of the character sequences, and a second sequence is a character sequence different from the first sequence. It determines at least one longest common subsequence for each of the at least one sequence pair by identifying common segments found in both the first sequence and the second sequence, and concatenating them together. Afterwards, it extends each of the longest common subsequence to form at least one combined sequence by inserting characters to the longest common subsequence, where the characters are found in first and second sequences but not in the longest common subsequence. Lastly, this method chooses a preferred sequence that has the highest average confidence score among the at least one combined sequence as the identification code candidate.

In a further embodiment, the determination of a longest common subsequence is done by generating a table of characters matched from the first sequence and the second sequence, and then extracting the longest common subsequence from the table.

In one embodiment, the object is a container and the selecting step selects the code candidate that satisfies a container code check-sum formula and achieves a highest average confidence score as the container code for that container.

By analyzing a plurality of images taken from the same object, and combine partial recognition results together, this method may be able to produce the correct recognition result that may otherwise be missed. Hence the overall recognition performance may be improved.

In another aspect of the invention, a system for determining identification code is described. The system comprises at least one camera and a computer system whereby when the computer system receives a trigger signal, the computer system takes a plurality of digital images from the at least one camera, produces partial recognition results for the plurality of digital images, and combines the partial recognition results together to produce the identification code.

In another embodiment, the identification code is a container code. The system in this embodiment comprises at least one camera mounted on a container handler that handles a cargo container, a computer system that is electrically coupled to the at least one camera, and electronic circuitry electrically coupled to the computer system. When the cargo container is hoisted or lowered to a specific height, the computer system receives a trigger signal from the electronic circuitry to take a plurality of digital images from the at least one camera, extracts container recognition results from the plurality of digital images, and combines the results together to produce the container code.

In one embodiment, the at least one camera is attached to a fixed extension arm that is attached to the container handler and the computer system enables one of the at least one camera to take a plurality of digital images according to the length of the container being hoisted or lowered.

In another embodiment, the system further comprises a motor that is attached to the container handler; and a mobile support that is coupled to the motor. The at least one camera is attached to the mobile support so that the computer system commands the motor to move the at least one camera to a predefined position according to the length of the container being hoisted or lowered. In an alternative embodiment, the camera is attached to a rotary support.

When a motor and a mobile support is used to capture plurality of digital images of a container from a container handler, the number of camera required to installed on the container handler can be reduced to minimum. Thus the overall system cost can be reduced.

DETAILED DESCRIPTION OF THE INVENTION

The following paragraphs use the cargo container as an example to illustrate exemplary embodiments in accordance with the invention. Exemplary embodiments, however, are not limited to being used with cargo containers. By way of example, exemplary embodiments can be used to recognize vehicle license plates, as well as other identification marks in digital images. As will be discussed in paragraphs below, there is an international standard that governs the container identification code. However, there is no such corresponding standard for vehicle license plates, and each country specifies its own license plate character format. Hence, cargo container recognition is used as an exemplary illustration of exemplary embodiments.

As used herein and in the claims, "container handler" refers to any mechanical equipment that lifts and moves a container. By way of example, container handlers include, but are not limited to, quay cranes, rail-mounted gantry cranes, rubber-tyred gantry cranes, top handlers, straddle handlers, and reach stackers. Further, as used herein, the term "mobile container handler" specifically refers to any container handler that is based on a vehicle, such as top handler, straddle handler, and/or reach stacker.

Figure 1:
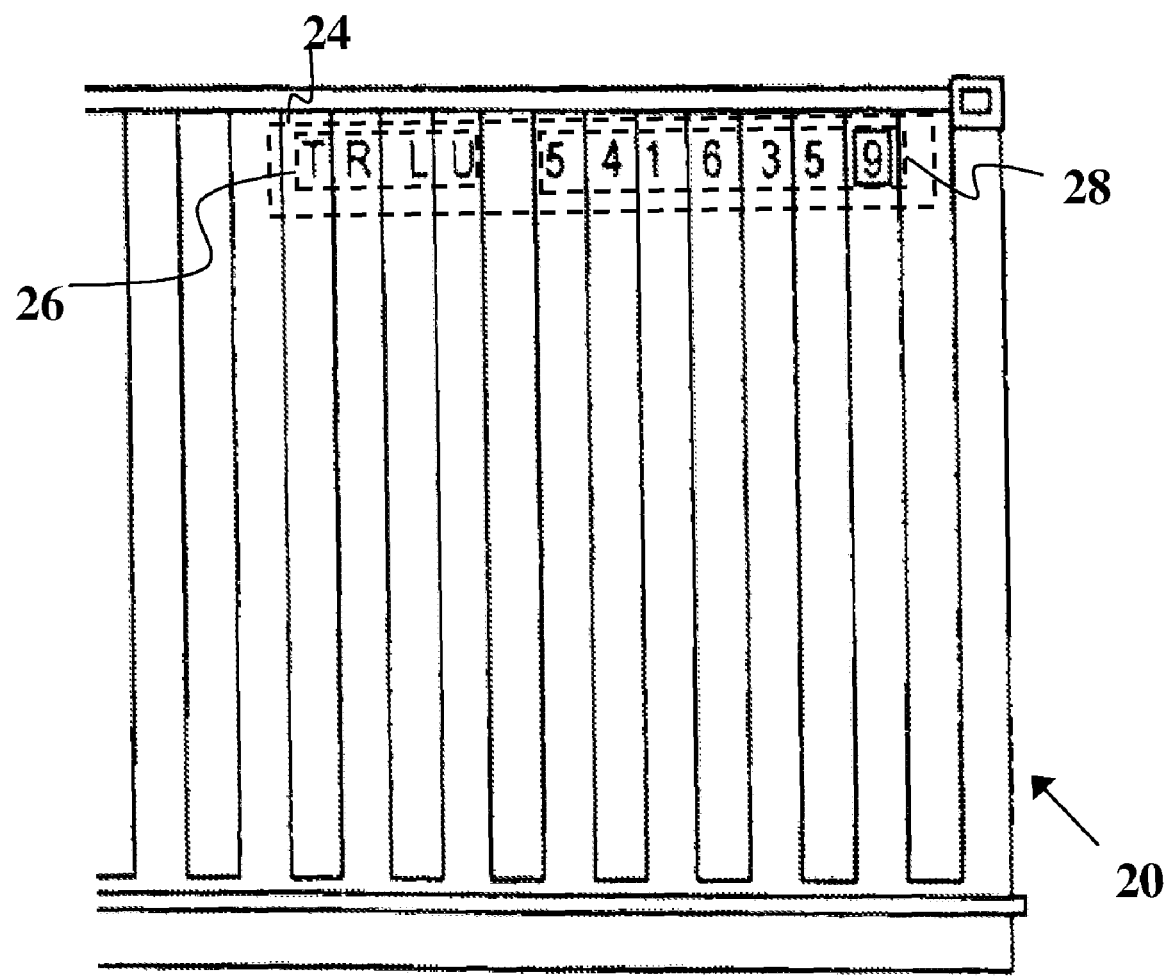
FIG. 1 illustrates prior art container codes and their representation on the side of a container.

FIG. 1 illustrates a typical cargo container with its container code and representation located on a side of a container 20. Each cargo container 20 is assigned a unique identification code, or container code. The container code is represented in the form of an alphabetical tag 26 and a numerical tag 28. The alphabetical tag 26 includes three characters representing the owner code and one character as an equipment category identifier. The numerical tag 28 includes a serial number of six numerals and a check digit. The container code is painted inside the marking area 24, which is located at a certain position on both sidewalls of the container 20 according to the ISO (International Organization for Standardization) 6346 standard. The marking area 24 is located in the upper right corner of the container 20, and the center of the marking area 24 is approximately 95 cm from the top edge and 132 cm from the right edge of the container 20. The container code can be painted either in a horizontal direction or in a vertical direction on the sidewalls, and can be painted in more than one row or one column. The marking area is fixed to the same position if taking the top right corner of the container as a point of reference. Numerous government agencies and shipping regulators require standard container codes to be marked on all containers. As a result, the painted container code representations of numerals and letters are used universally and internationally, as shown in FIG. 1.

Figure 2A:
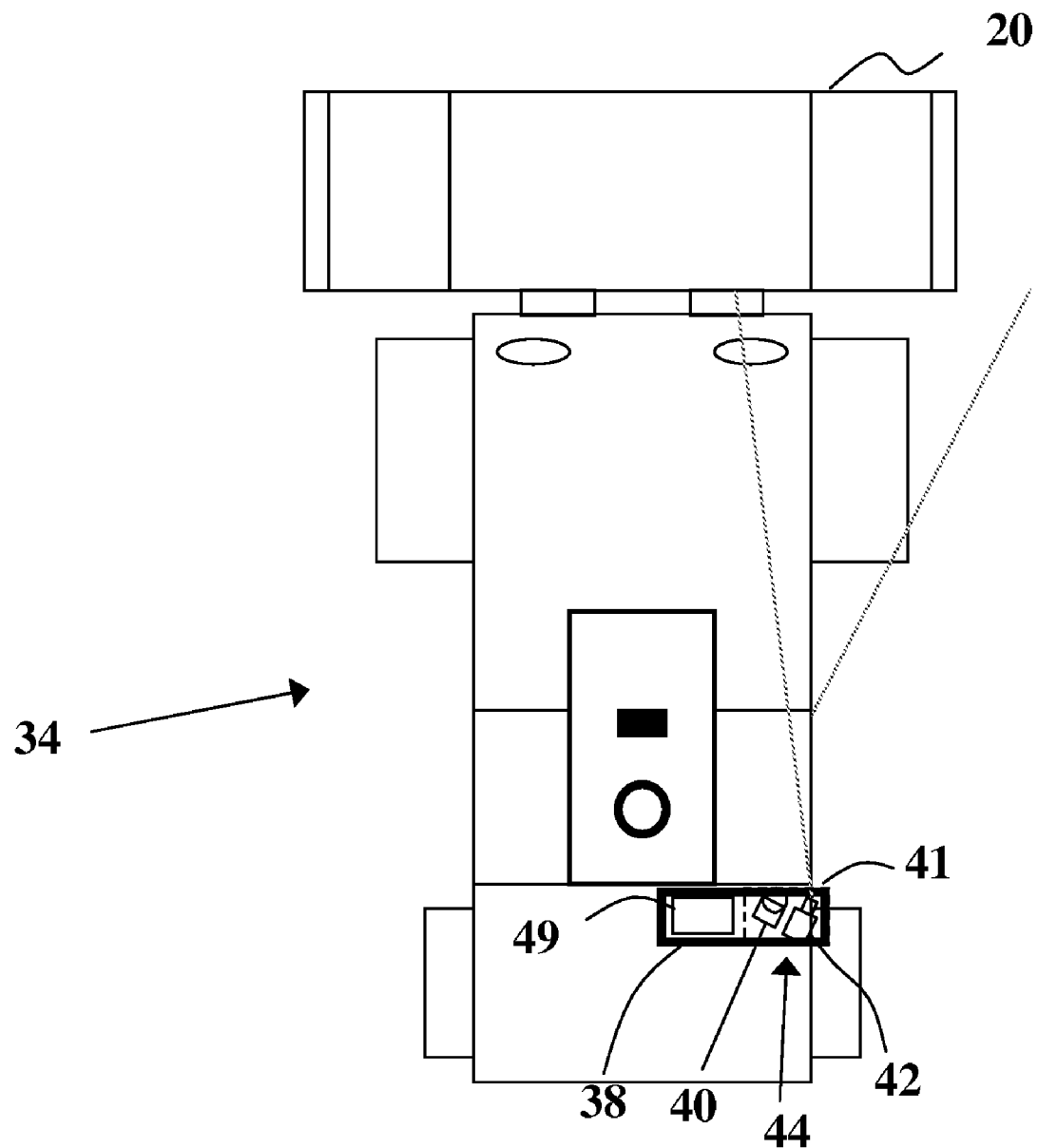
FIG. 2a is a top view of a container handler with a camera assembly installed on a flexible arm of the vehicle body positioned to capture images of a 20-foot container according to one embodiment.
Figure 2B:
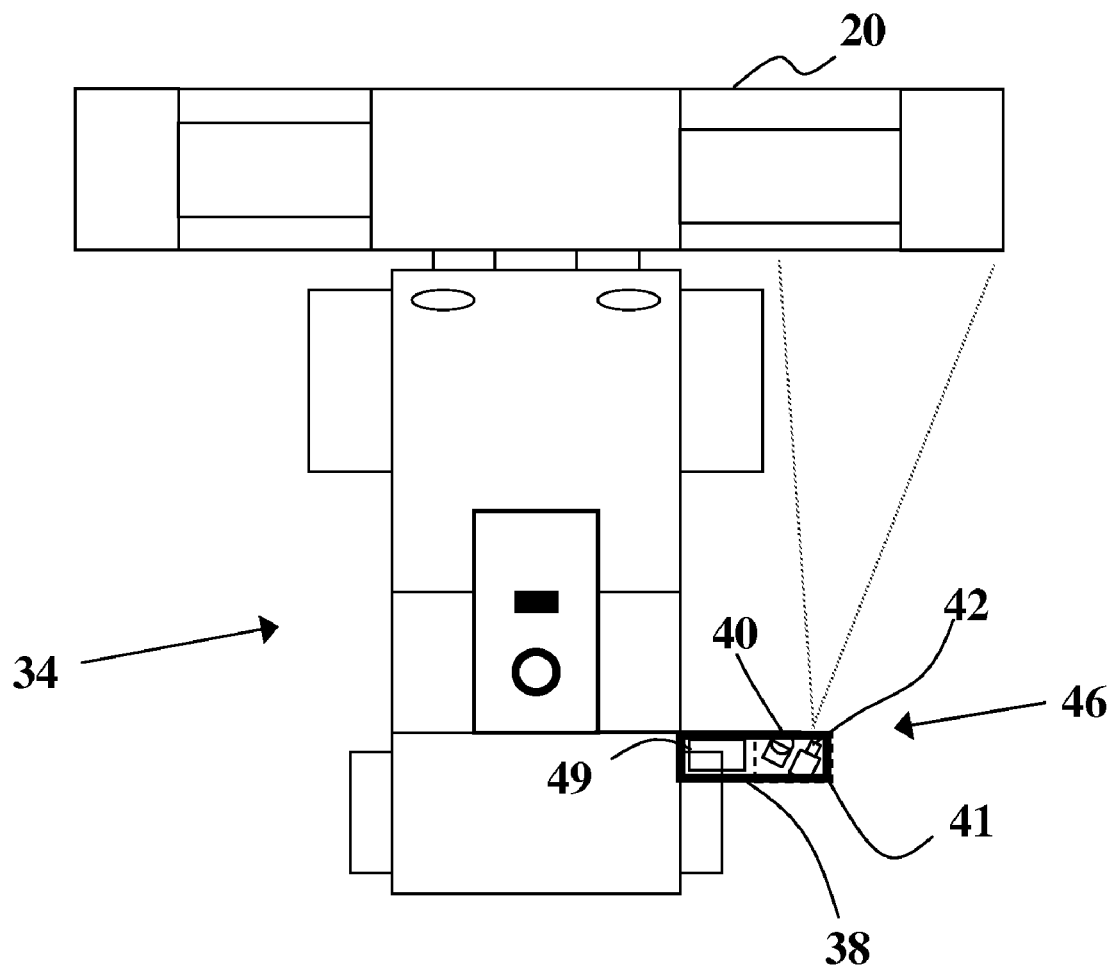
FIG. 2b is a top view of a container handler with a camera assembly installed on a flexible arm of the vehicle body. The flexible arm extends outwardly to capture images of a 40-foot container according to the same embodiment.

In the following discussion, a top-handler is used as the container handler to illustrate exemplary embodiments. Referring now to FIGS. 2a and 2b, the first embodiment of the present invention is an image capturing apparatus installed on container handler 34. A camera assembly 41 which includes a camera 42 and a light source or flash light 40 is mounted at one end of a flexible arm 38. The other end of the flexible arm 38 is coupled to an electrical motor 49, which in turn is fixed onto the body of the container handler 34. The flexible arm 38 is also referred to as a mobile support, and includes a telescoping bar, a crossbar or an articulating boom that can retract or extend when the electrical motor 49 is activated. In an embodiment, the camera assembly 41 is moved and positioned at a first camera position 44 if the container being hoisted is detected to be a first distance (for example, 20 feet long), and at a second camera position 46 if the container is detected to be a second distance (for example, 40 feet long). Moreover, the camera 42 is mounted at suitable pan-tilt angles so that it captures the whole marking area 24 on the container 20.

Figure 3A:
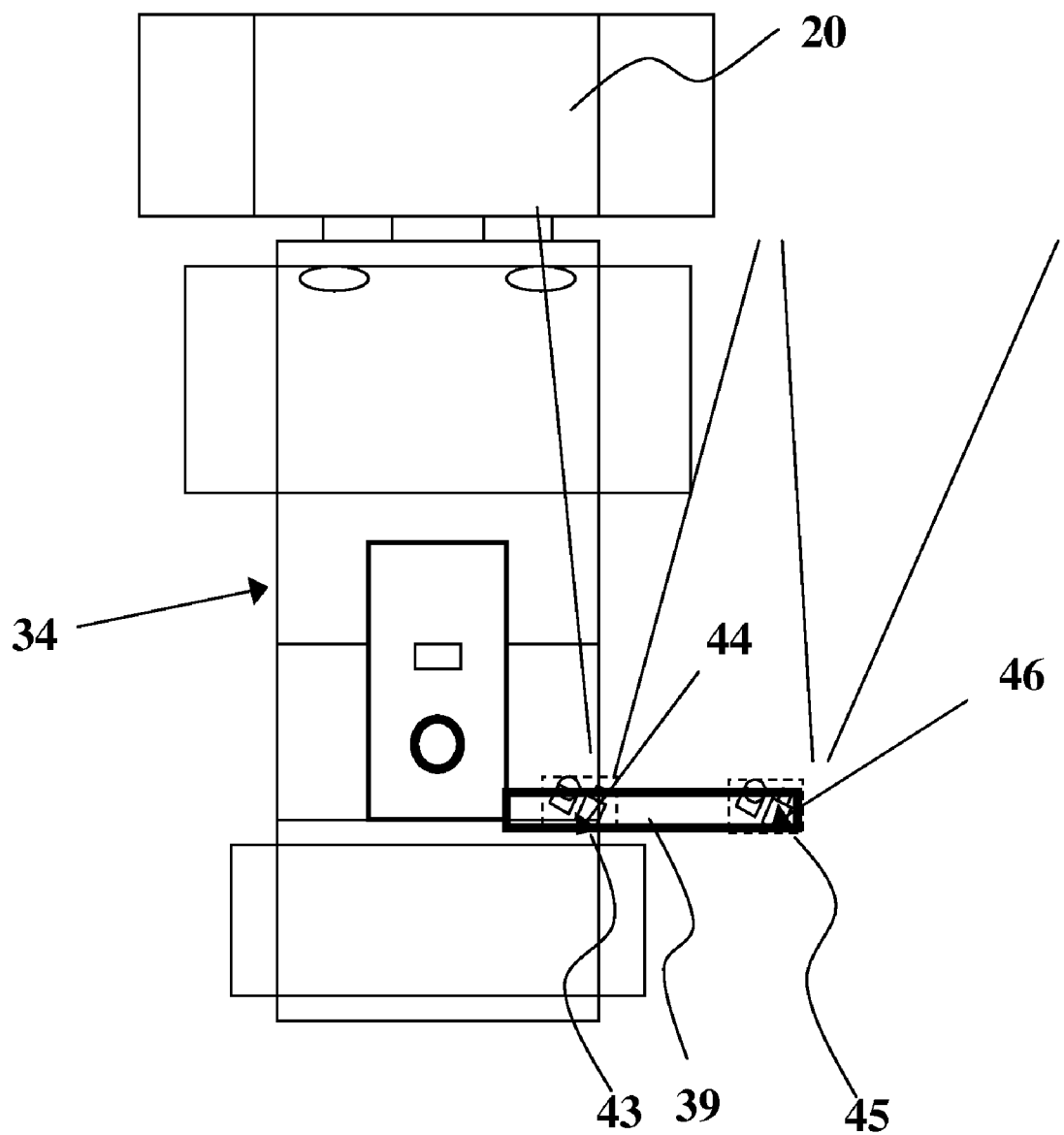
FIG. 3a is a top view of a container handler with two camera assemblies installed on an extension arm of the vehicle body according to an alternative embodiment. One camera assembly is positioned to capture images of a 20-foot container while another one to capture images of a 40-foot container.
Figure 3B:
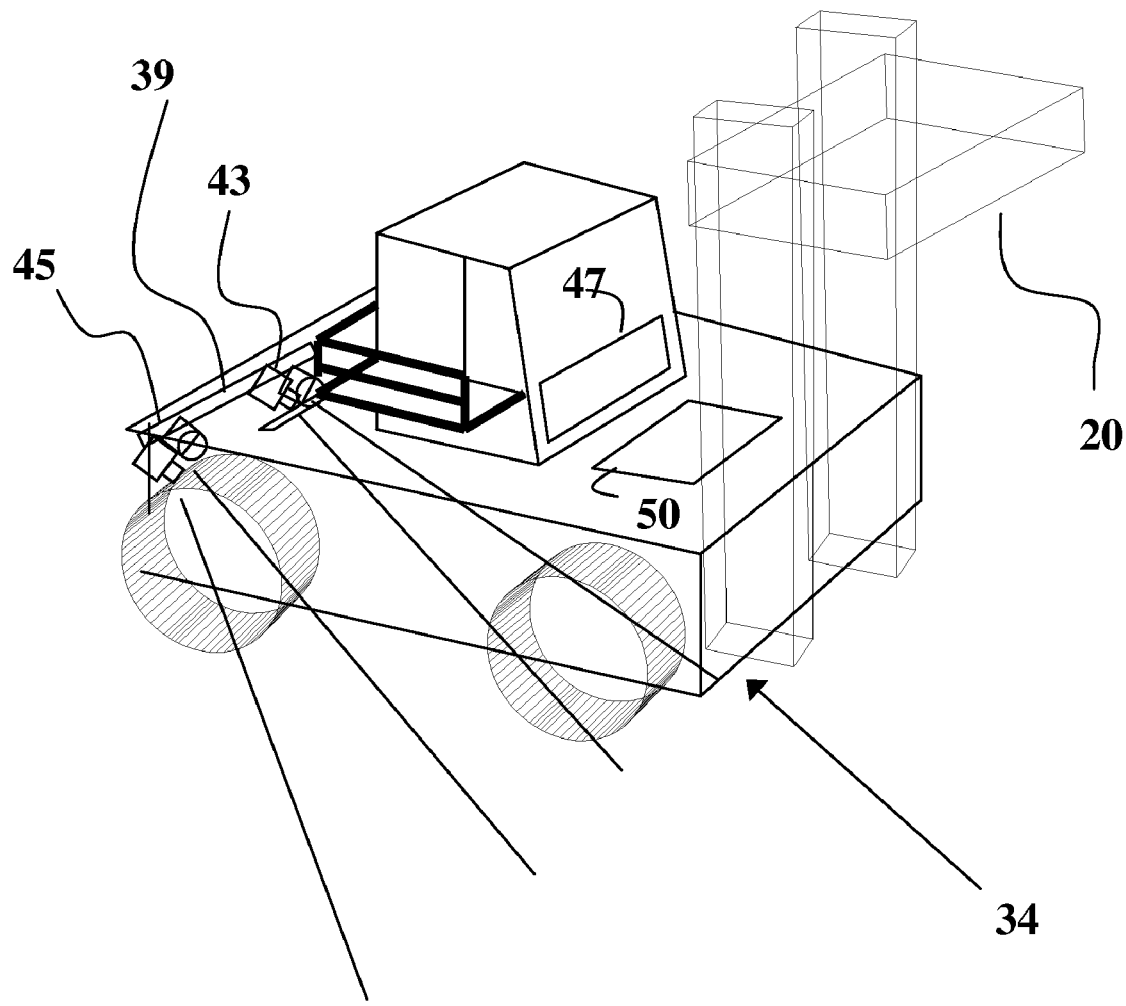
FIG. 3b is a perspective view of a container handler with two camera assemblies installed on an extension arm of the vehicle body according to an alternative embodiment.

In a second embodiment as shown in FIGS. 3a and 3b, two camera assemblies 43 and 45 are mounted on an extension arm 39. The first camera assembly 43 is positioned at the first camera position 44 for capturing images of 20-foot containers, whereas the second camera assembly 45 is positioned at the second camera position 46 for capturing images of containers longer than 20 feet.

Figure 4:
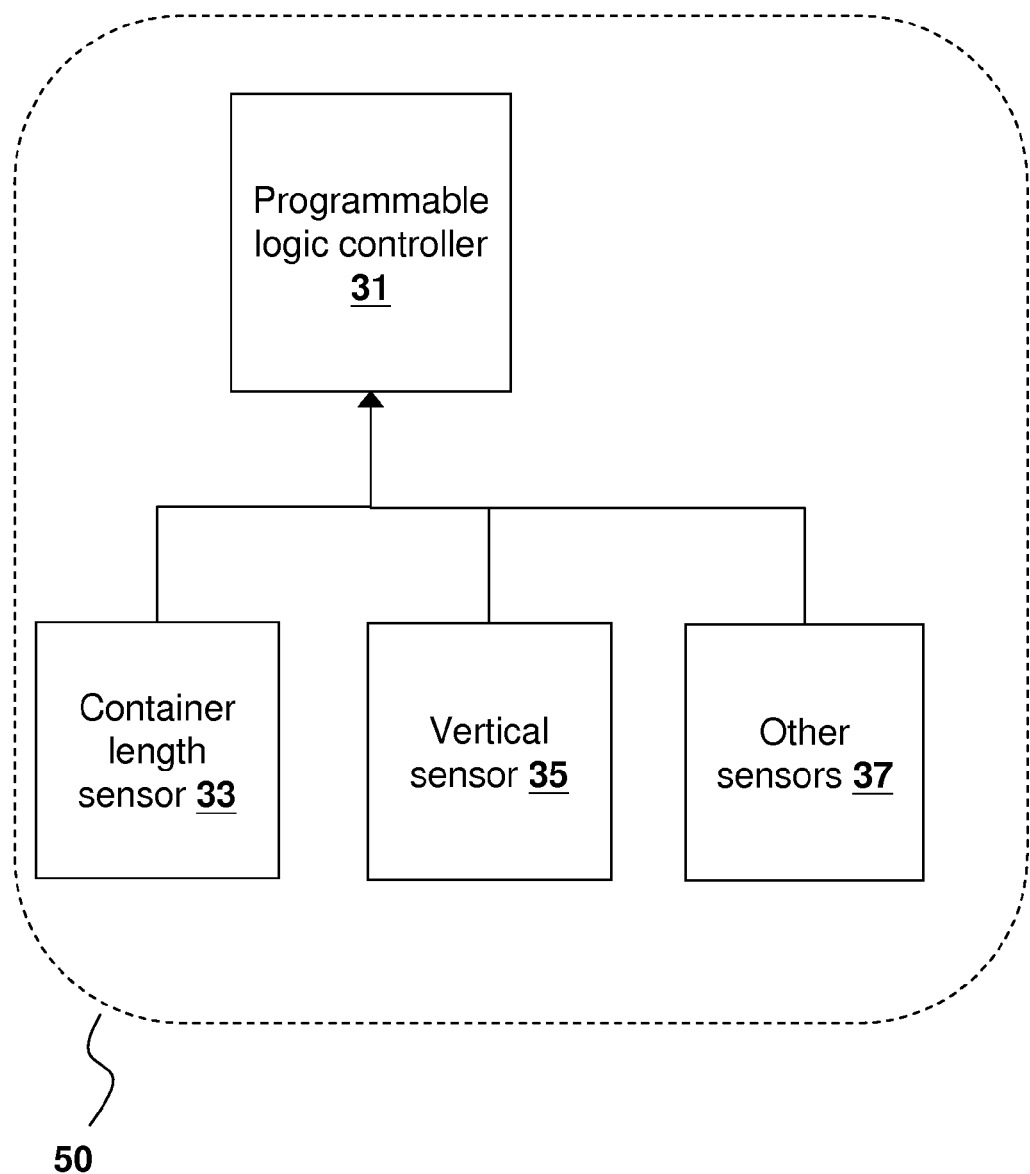
FIG. 4 is a block diagram of a sensor module according to an exemplary embodiment.

There is also an on-board computer system 47 and a sensor module 50 installed on the container handler. In one embodiment as shown in FIG. 4, the sensor module 50 further comprises an electronic circuitry and a plurality of sensors. In one embodiment, the electronic circuitry is a programmable logic controller (PLC) 31. The PLC 31 monitors the sensors and sends the sensor statuses to the on-board computer 47. There are two groups of sensors according to function. The first group detects the length of the container being hoisted, and is referred to as a container length sensor 33. The second group sends a trigger signal to the on-board computer system 47 when the container is lifted or lowered to a pre-determined height relative to the container handler. They are called as a vertical sensor 35. The software running on the on-board computer 47 is adapted to operate for both the first and the second embodiments. For the first embodiment, the computer sends out a control signal to activate the electrical motor 49 to move the camera assembly 41 to pre-specified positions, whereas for the second embodiment, it sends out a signal to enable one of the camera assemblies. The software also instructs the camera 42 to capture one or more digital images of the container, recognize the container code in that image, and forward that container code back to a host computer. The detailed software flow will be described later. In one implementation, the on-board computer system is an industrial grade personal computer (PC) with Core 2 Duo central processing unit (CPU) processor, 1GB random access memory (RAM), and a compact flash hard disk running an operating system. The computer system is also equipped with either an Ethernet card, a wireless LAN module with antenna, or both, as well as a RS232 serial link. The camera 42 is a color closed circuit television (CCTV) camera with ½" color charge-coupled device (CCD). In an exemplary embodiment, the effective resolution is 768×492. An auto-iris lens with 10~30 mm focal length is used. The flash light 40 is a white light strobe light lamp in one exemplary embodiment.

As the name implies, the container-length sensor detects the length of the container that is being operated on. There are many methods to measure the container length, and such methods can be used with exemplary embodiments.

In an embodiment, the PLC 31 controls the motor to extend or retract the spreader (the spreader is a mechanical device that grabs the top part of the container so that the container handler lifts it up) to a pre-defined length for 20 foot, 40 foot and 45 foot containers. The PLC also outputs the spreader length information, which is used to determine the container length. In another embodiment, buttons are provided inside the cabinet of the container handler that control the extension and retraction of the spreader. By visually observing the container to be hoisted, the operator presses the appropriate button corresponding to the container length. These buttons, therefore, also serve as container-length sensors.

Similarly, the vertical sensor can be implemented by a plurality of methods. Exemplary embodiments can be used with a wide variety of such methods.

In an embodiment, the spreader height is also returned from the PLC 31 which controls the motor to move the spreader to a pre-fined height. The PLC information is first calibrated to the actual height of the spreader from the ground. During operation, when the spreader is moved to inside the camera view area, a trigger signal is generated for the system to capture the digital images.

Figure 5:
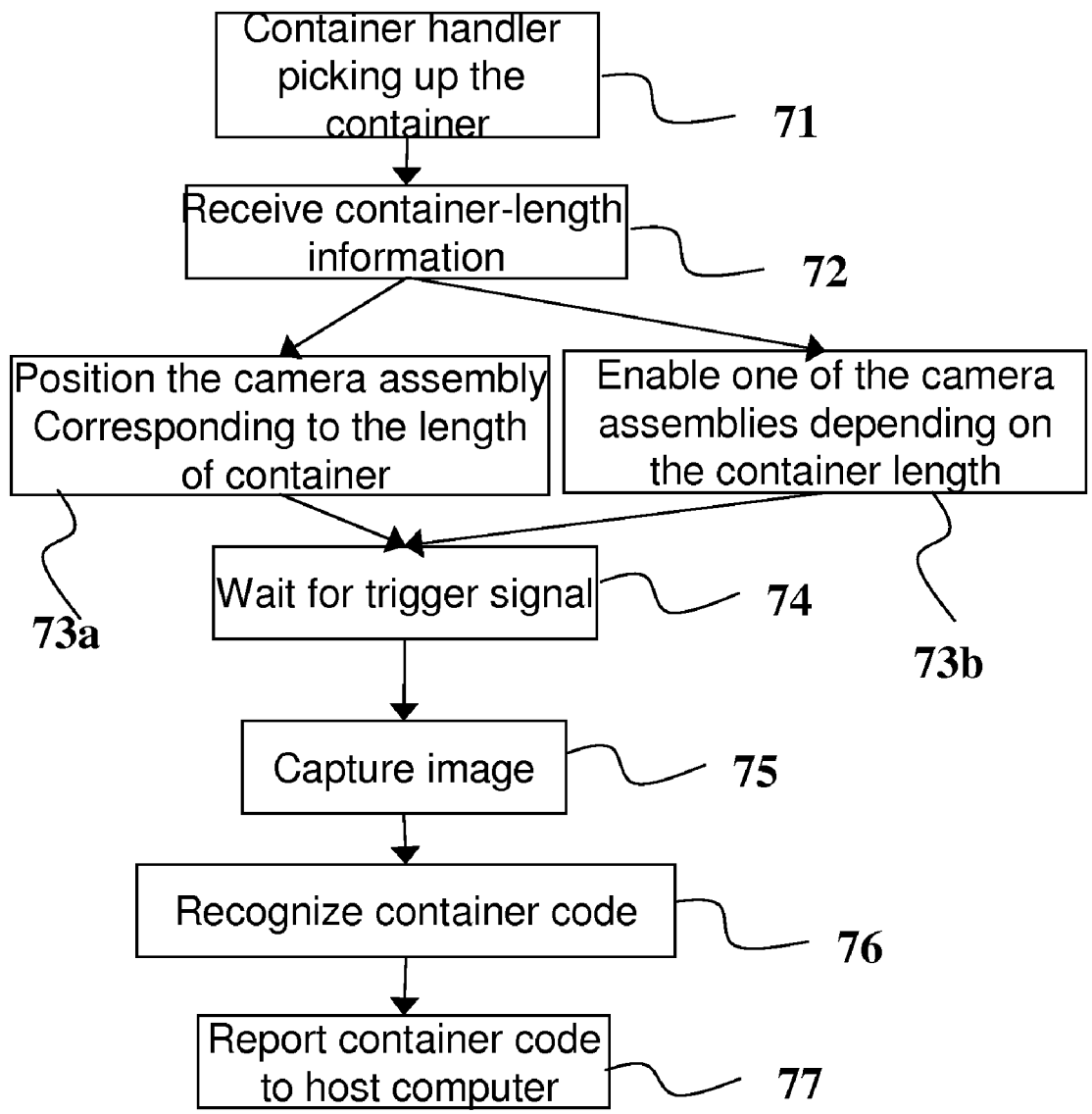
FIG. 5 shows the event flow of the automatic container identification operation.

The event flow of the image capturing and container code recognition is further explained in FIG. 5. When the container handler picks up a container (step 71), the container length information is sent to the on-board computer system (step 72). In one embodiment, this is achieved when the PLC sends the container length information to the on-board computer via the RS232 serial data link. If the top handler is equipped with a motorized flexible arm, the computer commands the motor to shift the camera assembly to the pre-specified position corresponding to the length of the container (step 73*a*). For the fixed extension arm case, the computer selects and enables one of the two camera assemblies depending on the length of the container (step 73*b*). The computer then waits for the trigger signal that is generated when the container is hoisted or lowered to a pre-determined position as shown in step 74. This signal is used to instruct the camera to capture an image (step 75). In another embodiment, it also turns on the light source or flash light 40 to illuminate the marking area 24 on the container 20, and also instructs the camera to capture one or more images that contains the marking area 24 of container code that was painted at the upper right corner of the container 20. This allows the camera 42 to capture images of the marking area 24 in a satisfactory condition of brightness, irrespective of the surrounding environment luminance. The computer then recognizes the container code in that image (step 76) and report the result to the host computer (step 77).

Figure 6:
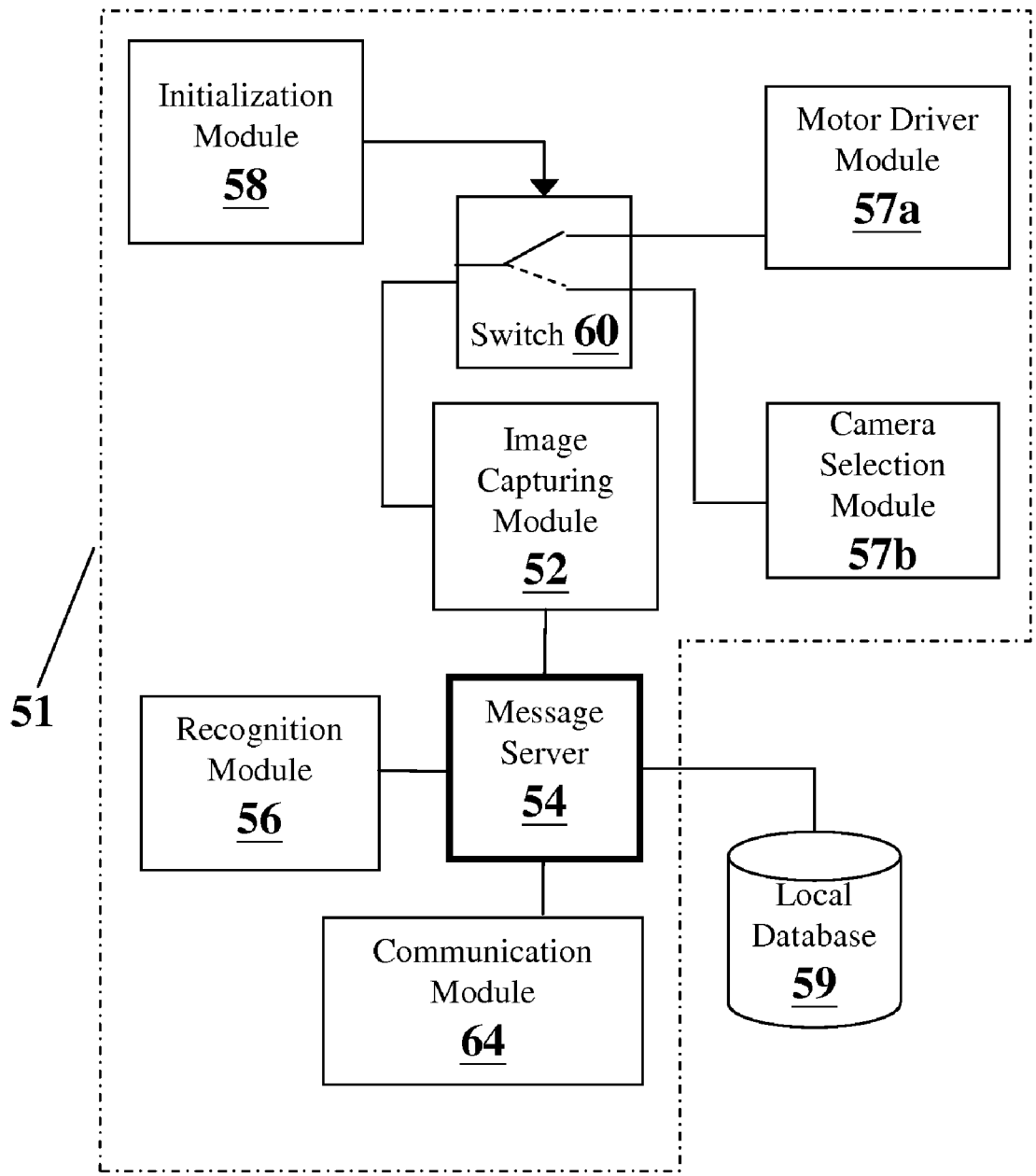
FIG. 6 is the software block diagram of an automatic container identification system according to one embodiment.

In the present embodiment, the event flow is realized in a software 51 running on the on-board computer system 47 as shown in FIG. 6. The software 51 comprises a message server 54, an image capturing module 52, a recognition module 56, a communication module 64, a motor drive module 57*a* and a camera selection module 57*b* as shown in FIG. 5. There is also a local database 59 that can be accessed by the message server 54. The software 51 further comprises an initialization module 58 and a software switch 60. Whenever the computer system is switched on, the initialization module 58 checks whether the container handler is equipped with a motorized flexible arm as shown in FIGS. 2*a* and 2*b*, or a fixed extension arm as in FIGS. 3*a* and 3*b*. In the former case, the switch 60 enables the motor driver module 57*a*. Otherwise, it enables the camera selection module 57*b*. The communication module 64 receives the manifest list from the host computer and the PLC data on sensor status. The manifest list comprises a list of container codes that this container handler is expected to hoist. It then forwards them to the message server 54. Upon receiving the PLC data, the message server 54 digests its content and passes it to the image capturing module 52. The image capturing module 52 extracts the container size information from the PLC data. Depending on the setting of the software switch 60, the image capturing module 52 either commands the motor driver module 57*a* to position the camera assembly 41 to a pre-specified position, or orders the camera selection module 57*b* to enable one of the camera assemblies according to the length of the container. When the image capturing module 52 receives the trigger signal from the PLC data, it captures one or more image and sends it back to the message server 54, which forwards it to the recognition module 56. The recognition module 56 then analyzes the captured image and recognizes the container code. For each captured image, the recognition module first identifies where the string of container code is located, and then recognizes the individual characters in this string. When multiple images of the same container are captured, an algorithm (described later) is employed to combine the recognition results together, and generate a recognized container code. Once completed, the recognized container code is sent back to the message server 54. The message server 54 then reports the recognized container code back to the host computer through the communication module 64. Meanwhile, it also compares the recognized container code against the manifest list, and stores the result together with the newly captured image to the local database 59 for future use.

The container codes may be recognized by the automatic recognizer from the images of the same container captured by a single camera at different time. These partial results are used to construct the final result. For example, not all the characters of the container code are visible if the container is too close to the camera. Different parts of the container codes appear at different image captured in different time. There may also be possible that some characters are not visible due to strong backlight or other environmental factors. An algorithm is thus purposed to make use of all these partial results. It is mainly based on finding the longest common subsequence (LCS) among container code pairs. Combined with the confidence score of container codes, a better result can be found from each container code pair. The confidence of the container code results from the automatic recognizer that is jointly determined by the company code, check digit and the neural network scores.

As mentioned before, the ISO 6346 standard (Freight Containers-coding, identification and marking) comprises the company code, a serial number of six (6) Arabic numerals and a seventh digit (check digit) for validation. For example, the code may be 'BICU 1234567'. Therefore, if the company code and the check digit of a recognized container code are in compliance with the ISO 6346 standard, it should be correct. In this case, the container code is said to satisfy the check-sum formula as specified by the ISO 6346 standard. In other embodiments such as vehicle license plate recognition, there may also be a check-sum formula for vehicle license numbers. This formula is specified by a government authority of that country.

In one embodiment, the automatic recognizer makes use of artificial intelligence, or more specifically, neural networks to recognize the company code. Basically, it is a general feed-forward multi-layer perceptron with one hidden layer, trained by the back-propagation algorithm. The number of nodes composing the input layer, the hidden layer and the output layer are 256, 100 and 35 respectively.

As an exemplary illustration, the input to the neural network is the normalized character pattern, which is a 16 by 16 gray-level pixel-matrix. Each input node receives the state of one pixel, whose value is either 0 or an integer within the range 128 to 255. At the output layer, the 35 output nodes are associated with the 35 alphanumeric character categories (i.e 0-9, A-Z except O) to be recognized. The numeral category 'O' and the alphabet category 'O' are considered as indistinguishable. The neural network score of an output node can be any floating-point value (i.e., the score) in the range [0 . . . 1]. Given an input character pattern, the neural network score of each output node resulted from the network operation describes the likelihood for the character pattern input to be regarded as the category associated with that node. The node with the highest neural network score is selected as the recognized character. Therefore, the average individual neural network score of the characters of the recognized container code is another criterion for determining the validity of the recognized result.

There are 5 alignments of the characters of the container codes on the container surface:

| One column | Two Columns | |
|---|---|---|
| B | B | 1 |
| I | I | 2 |
| C | C | 3 |
| U | U | 4 |
| 1 | | 5 |
| 2 | | 6 |
| 3 | | 7 |
| 4 | | |
| 5 | | |
| 6 | | |
| 7 | | |

| One Row | BICU 1234567 |
|---|---|
| Two rows | BICU |
| | 1234567 |
| Three rows | BICU |
| | 123 |
| | 4567 |

These alignments restrict the possible positions of the characters of the container code. It helps the automatic recognizer to filter out the false recognition results.

The longest common subsequence is finding the longest subsequences in a set of sequences (often just two sequences). In the case of two strings, i.e. character sequences, finding the longest common subsequences is the same as finding the longest common sub-string of the two strings. For example, assume that the two input strings X and Y are:

X=ABCBDAB

Y=BDCABA

The possible common sub-strings are AB, ABA, BCB, BCAB, BCBA, BDAB etc. As there are no common sub-strings longer than five (5) characters, the longest common sub-strings are all the common sub-strings of 4-character long including BCAB, BCBA and BDAB etc.

In general, if there are two input strings $X_m$ and $Y_n$ of length m and n respectively with an LCS $Z_k$ of length k:

$$X_m = x_1 x_2 \ldots x_m$$

$$Y_n = y_1 y_2 \ldots y_n$$

$$Z_k = z_1 z_2 \ldots z_k,$$

we can formulate the following properties:

If $x_m = y_n$, then $x_m = y_n = z_k$ and $Z_{k-1}$ is an LCS of $X_{m-1}$ and $Y_{n-1}$ (1)

If $x_m \neq y_n$, then $z_k \neq x_m$ implies $Z_k$ is an LCS of $X_{m-1}$ and $Y_n$ (2)

If $x_m \neq y_n$, then $z_k \neq y_n$ implies $Z_k$ is an LCS of $X_m$ and $Y_{n-1}$ (3)

That means if $x_m = y_n$, we need find the LCS of $X_{m-1}$ and $Y_{n-1}$. And if $y_n \neq x_m$, we need to find the longer of LCS between the $X_{m-1}$ and $Y_n$ pair and the $X_m$ and $Y_{n-1}$ pair. Based on these three properties, we can solve the problem of finding LCS by first finding the length of all the LCS using dynamic algorithm. The following function return a table C storing the lengths of different LCS of input string $X_m$ and $Y_n$

```
FUNCTION LGC-LENGTH(X,Y)

for i := 0 : m
    C[i,0] = 0
for j := 0 : n
    C[0,j] = 0
for i := 1:m
    for j : = 1:n
        if X[i] = Y[j]
            C[i,j] := C[i-1 , j-1] + 1
        else
            C[i,j] := max(C[i-1 , j-1], C[i-1 , j])
return C
```

Another function is required to extract the LCS from the table returned by the function LENGTH

```
FUNCTION LGC-READ(C,X,Y,i,j)

if i = 0 or j = 0
    return Null result
else if X[i] = Y[j]
    return LGC-READ(C,X,Y,i-1 ,j-1) and concatenate X[i] to all the
    results returned
else
    if C[i,j-1] ≧ C[i-1 ,j]
        A := LGC-READ(C,X,Y,i,j-1)
    if C[i-1 ,j] ≧ C[i,j-1]
        B := LGC-READ(C,X,Y,i-1 ,j)
    R := A and B
    Return R
(*Note: i = m and j = n for the first time)
```

For example, the two input strings are GESU47027 and GES20271, the length table C generated by the function LGC-LENGTH is shown as follow:

FIG. 2.1 Table resulted from LGC-LENGTH

|   | | G | E | S | U | 4 | 7 | 0 | 2 | 7 |
|---|---|---|---|---|---|---|---|---|---|---|
|   | 0 | 0 | 0 | 0 | 0 | 0 | 0 | 0 | 0 | 0 |
| G | 0 | 1 | 1 | 1 | 1 | 1 | 1 | 1 | 1 | 1 |
| E | 0 | 1 | 2 | 2 | 2 | 2 | 2 | 2 | 2 | 2 |
| S | 0 | 1 | 2 | 3 | 3 | 3 | 3 | 3 | 3 | 3 |
| 2 | 0 | 1 | 2 | 3 | 3 | 3 | 3 | 3 | 4 | 4 |
| 0 | 0 | 1 | 2 | 3 | 3 | 3 | 3 | 4 | 4 | 4 |
| 2 | 0 | 1 | 2 | 3 | 3 | 3 | 3 | 4 | 5 | 5 |
| 7 | 0 | 1 | 2 | 3 | 3 | 3 | 3 | 4 | 5 | 6 |
| 1 | 0 | 1 | 2 | 3 | 3 | 3 | 3 | 4 | 5 | 6 |

The bold characters form the longest path form the bottom right to the top left corner when reading the LCS by LGC-READ. The result returned by the function is thus GES027.

Figure 7:
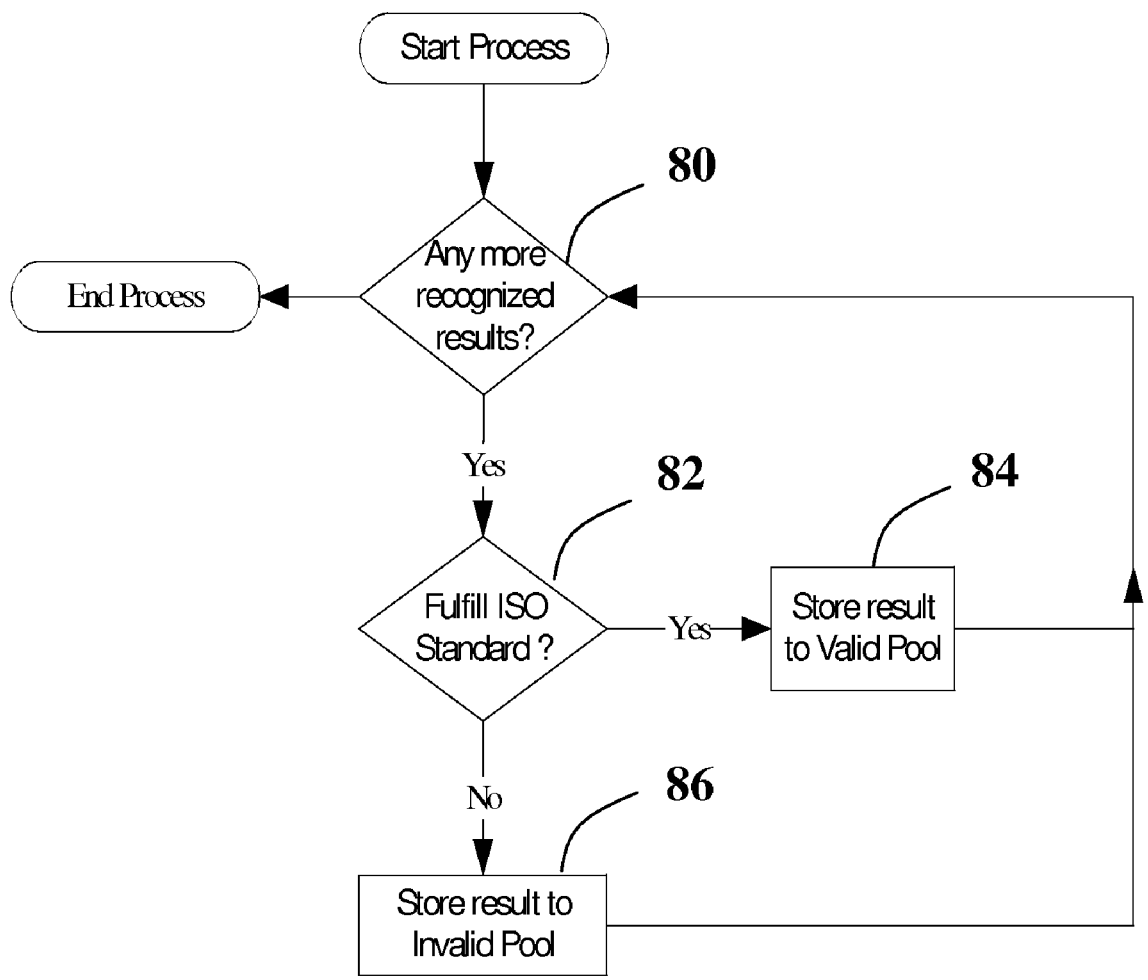
FIG. 7 is the flow chart for checking the container code recognition results and storing them to either the valid or invalid pool for future analysis according to one embodiment.

Referring to FIG. 7, assume that there are n images captured from a single camera on the same cargo container code. The system first checks if there are any more recognized results (step 80). If all recognized results are processed, then it will exit. Otherwise, each recognized container code is checked according to the ISO 6346 standard (step 82). If the result conforms to the standard, it is stored to the pool of valid container codes first (step 84). Otherwise, it is stored to the pool of invalid container codes (step 86).

Figure 8:
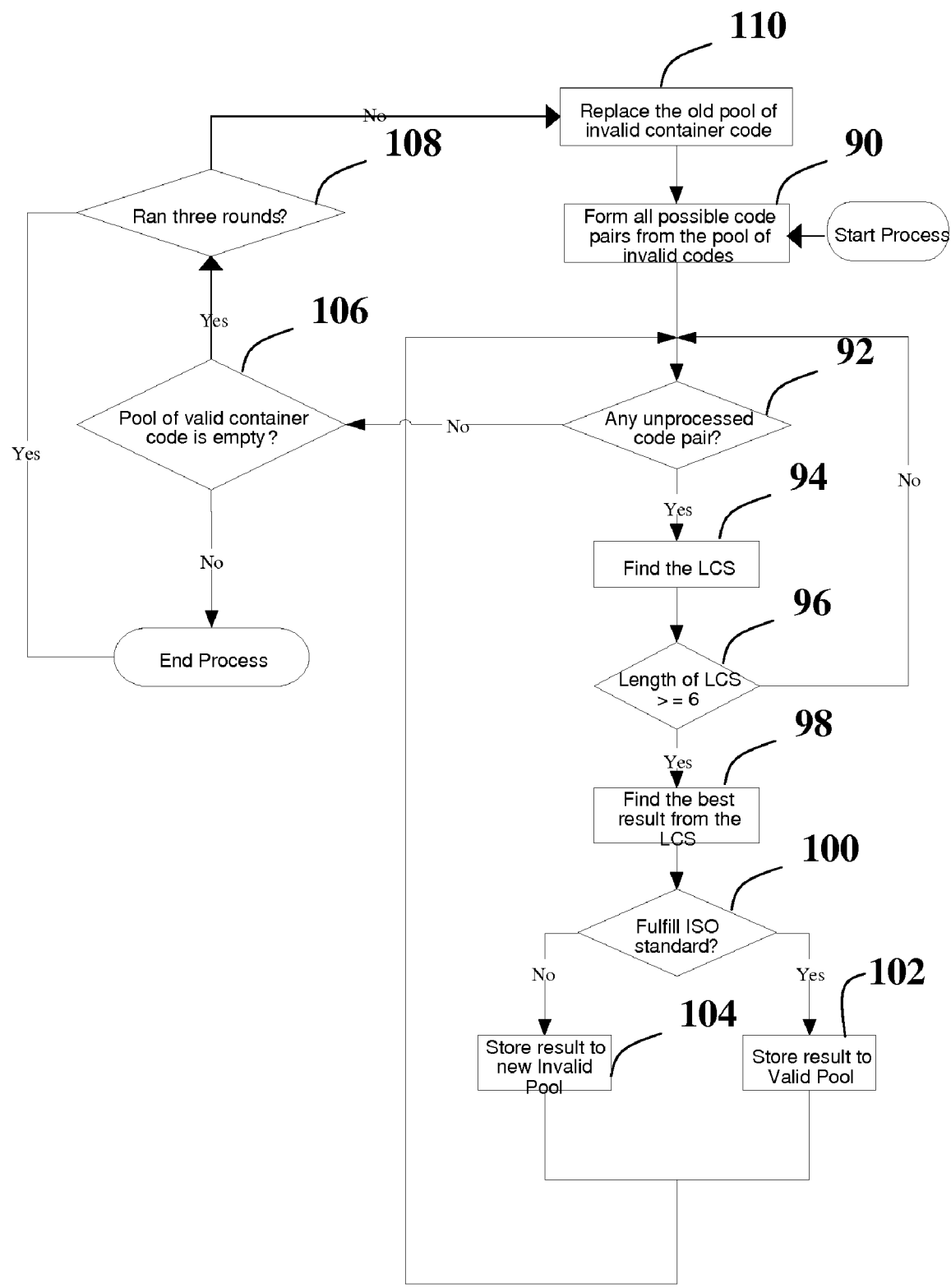
FIG. 8 is the flow chart of using the LCS algorithm to process the container code in the invalid pool in accordance to one embodiment.

A flow chart of processing the invalid container code combination is shown in FIG. 8. From the pool of invalid container codes, all possible combinations of two pairs of character strings are formed (step 90). Assume that there are m container codes in the invalid pool, the number of pairs is therefore:

$$_mC_2 = \frac{m!}{(m-2)!2} \quad (4)$$

If there is any unprocessed code pair (step 92), it will proceed to execute step 94. Otherwise, it will proceed to step 106. In step 94, the longest common subsequence is found for each container code pair. For example, if the four invalid container results for a one-row container code GESU4702714 are,

GESU47027
GES20271
ESU470274
SU4702714

The 6 LCS from 4 pairs of container code results would be:

| Pair | G E S | U | 4 |   | 7 0 2 7 | G | E S U 4 7 0 2 7 | G E | S U 4 7 0 2 7 |
|---|---|---|---|---|---|---|---|---|---|
|   | G E S |   | 2 |   | 0 2 7 1 |   | E S U 4 7 0 2 7 4 |   | S U 4 7 0 2 7 1 4 |
| LCS | G E S |   |   |   | 0 2 7 |   | E S U 4 7 0 2 7 |   | S U 4 7 0 2 7 |

| Pair | G | E S U 2 0 2 7 1 | G E | S |   | 2 0 2 7 1 | E | S U 4 7 0 2 7 | 4 |
|---|---|---|---|---|---|---|---|---|---|
|   |   | E S U 4 7 0 2 7 4 |   | S | U | 4 7 0 2 7 1 4 |   | S U 4 7 0 2 7 1 4 |   |
| LCS |   | E S U   0 2 7 |   | S |   | 0 2 7 1 |   | S U 4 7 0 2 7 | 4 |

In one embodiment, the algorithm further checks that the LCS is at least 6-character long (step 96). The container pair with LCS shorter than six (6) characters is regarded as not similar enough for combining results. Once a long enough LCS is found, the algorithm tries to fill the missing characters in the LCS in order to find a single result.

In a further embodiment, the algorithm attempts to fill in or insert a potentially missing character (step 98). The insertion is restricted by the space between the characters in the image. For a container result, if the space between two characters is smaller than the average size of the characters, the missing character from the other result is not inserted. On the other hand, if the space between two characters is large enough to accommodate more than one character, the maximum possible number of missing characters is inserted. For the first character and the last character, the number of characters to be inserted is only bound by the image size. According to the previous example, further assumptions on spatial arrangement in the container results are thus made. Based on these assumptions, all possible combination of container results from the LCS are shown as follow:

| Pair | GESU47027<br>GES 2 0271 | GESU47027<br>ESU470274 | GESU47027<br>SU4702714 |
|---|---|---|---|
| Possible string | GESU470271<br>GESU270271<br>GESU420271<br>GESU720271<br>GES2 470271<br>GES4 270271<br>GES4 720271 | GESU470274 | GESU4702714 |
| Space Assumption | 1. Three character spaces between S and 0<br>2. No limit in the last character | 1. No limit in the last character and in the first character | 1. No limit in the last character and in the first character |

| Pair | GESU2 0271<br>ESU470274 | GES 2 0271<br>SU4702714 | ESU47027 4<br>SU4702714 |
|---|---|---|---|
| Possible String | GESU470271<br>GESU270271<br>GESU420271<br>GESU720271<br>GESU470274<br>GESU270274<br>GESU420274<br>GESU720274 | LCS shorter than 6 characters | ESU4702714 |

-continued

|  | GESU2 0271 ESU470274 | GES 2 0271 SU4702714 | ESU47027 4 SU4702714 |
|---|---|---|---|
| Pair |  |  |  |
|  | GESU4702714 |  |  |
|  | GESU2702714 |  |  |
|  | GESU4202714 |  |  |
|  | GESU7202714 |  |  |
|  | GESU4702741 |  |  |
|  | GESU2702741 |  |  |
|  | GESU4202741 |  |  |
|  | GESU7202741 |  |  |
| Space Assumption | 1. Two character spaces between U and 0 2. No limit in the last and the first character |  | 1. No limit in the last character and in the first character |

The correct result GESU4702714 can be found in the possible results of the GESU20271 and ESU470274 pair and GESU47027 and SU4702714 pair.

In general, among all the possible results of each container code pair, the one that follows the ISO 6346 standard with the maximum neural network score are stored to the pool of valid container results stated before (step 102). If no possible results fit the ISO 6346 standard, the one with the maximum neural score is stored to a new pool of invalid container results (step 104). Once all the $_mC_2$ pairs are processed, the new pool of invalid container code replaces the current pool of invalid container codes (step 110). If the pool of valid container code is empty, the whole process is repeated for at most three rounds (step 108) until a valid container code can be constructed.

Figure 9:
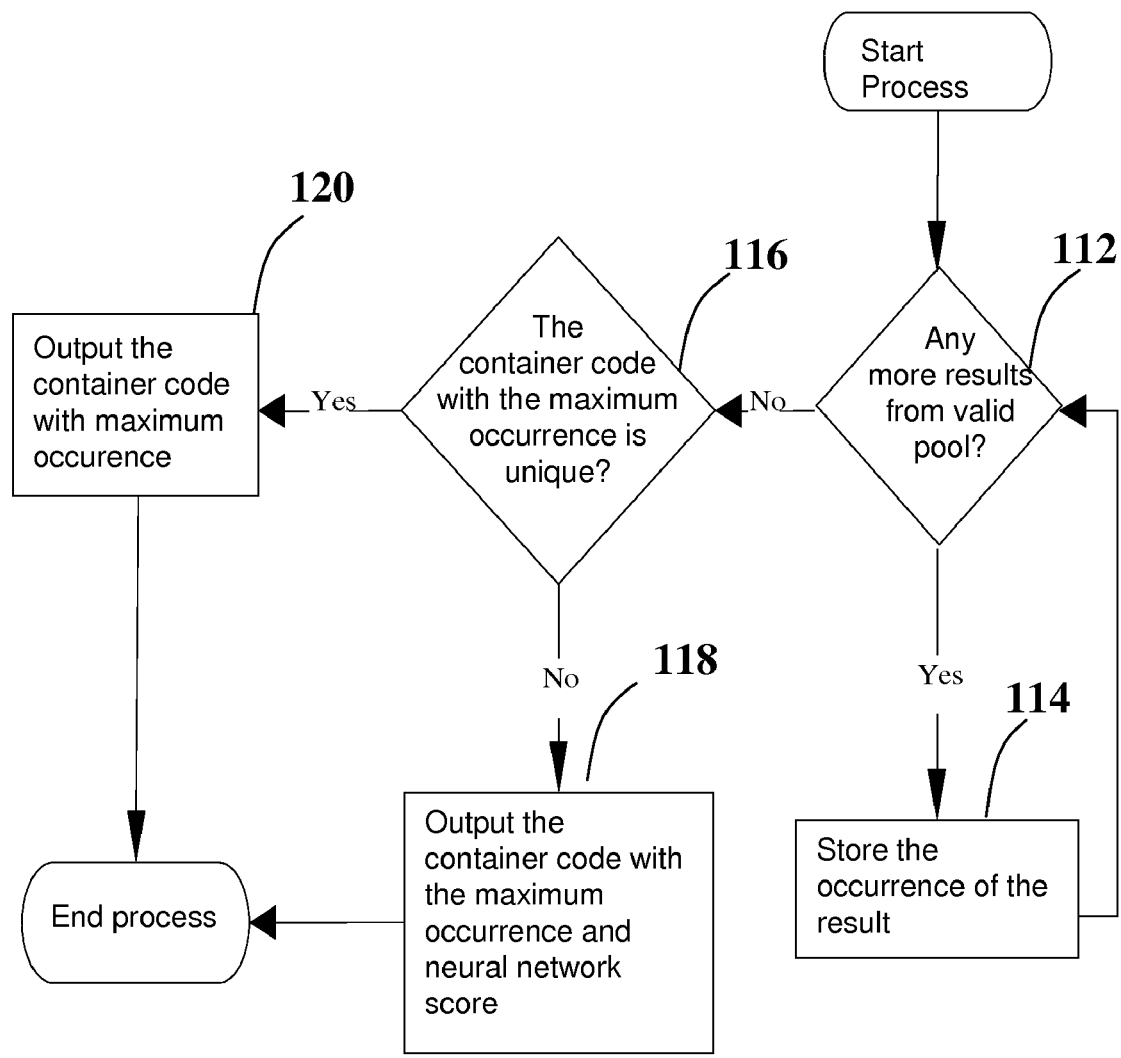
FIG. 9 is the flow chart of outputting the container code based on the LCS analysis according to one embodiment.

Referring to FIG. 9, in the pool of valid container codes, including the original valid codes and the codes constructed from invalid code, one single result is selected. Unlike the previous selection algorithms, the occurrence of the code comes to the first priority. Firstly, step 112 checks if there is any more recognition result to be added to the valid pool. For each result, the number of time (the occurrence) of that recognized result is computed in step 114. Step 116 checks if the container code corresponding to the code with maximum occurrence is unique. If so, the container code with the maximum occurrence code is selected as the final result (step 120). If there are other candidates with the same maximum occurrence, the neural score is the selection criteria. The candidate with the maximum neural score is output as the final result (step 118).

The embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the container 20 shown in FIG. 2 is 20 feet long and that shown in FIG. 3 is 40 feet long; but it is clear that this invention is also applicable to containers of other types and sizes. The suitable types of containers include but not limited to general purpose containers, hard-top containers, high-cube containers, bulk containers, tank containers, etc, with different sizes varying from 10 feet to 53 feet in length.

As mentioned previously, while cargo container ID is used throughout this description, the present invention can also be applied to recognize other types of ID character strings—for example, vehicle license plate, one-dimensional or two-dimensional bar codes, or certain identification marks in a label. The format of the vehicle license character varies from country to country. Some may have a check-sum formula while others do not. In the case where there is a check-sum formula, the entire system and method disclosed above can be applied. For cases that there is no check-sum formula, the processing steps involving the valid pool need not be used.

While the top-handler is used to illustrate the inventive principle, the same idea of shifting the camera assembly by a motorized mobile support to the proper position corresponding to the length of the container being hoisted is also applicable to other types of container handlers. It is obvious that those skilled in the art can devise different motorized mobile support apparatuses based on the teaching given here for different kinds of container handling equipments such as quay crane, rail-mounted gantry crane, rubber-tyred gantry crane, . . . , etc.

The flexible arm 38 shown in FIG. 2 is capable of elongating and/or telescoping. However, it is obvious for one skilled in the art to devise other kinds of mobile supports, for example, articulating arm or robotic arm, as long as it is movable and able to support the camera assembly 41. In another embodiment, the mobile support is a rotary support onto which the camera assembly is coupled. The camera assembly is shifted to a first horizontal angle for 20-foot containers, and to a second horizontal angle for containers longer than 20 feet. In yet another embodiment, the rotational and translational mechanisms is provided on the same system. Also, the electrical motor 49 can be driven by other energy sources other than electricity.

It should be obvious to one skilled in the art that the number of cameras installed in the flexible arm (FIG. 2a) or in the fixed extension arm (FIG. 3a) need not be fixed as shown in those figures. In some cases and harsh environments, the number of cameras can be increased, so that multiple images can be taken by multiple cameras from slightly different positions or angles. The recognition results from these images can be combined in a similar way as mentioned above to improve the overall recognition accuracy. Moreover, the camera can be an analog camera or a digital camera, or any other kinds of camera that allows the computer system to capture a digital image.

Although the manifest list is mentioned in the previous description, it is not an essential element of the entire computer operation, and the computer system 51 can also operate without such a list.

While a PLC controller is mentioned here to monitor the sensor status and report it to the on-board computer, it is also obvious to one skill in the art that other technologies can be used to implement the sensor module. By way of example, a micro-processor based sensor module is used in lieu of the PLC controller. The micro-processor module reads the status of the sensors, either by polling or interrupt methods, and forward this information to the on-board computer. In the detailed description, the PLC controller is coupled to the computer via a RS232 serial link. It is obvious that other data communication means can also be used.

FIG. 4 describes an event flow whereby the on-board computer relies on an external trigger signal which indicates that the container has been hoisted to a pre-determined height. An alternative implementation is to let the image capturing module 52 capture images continuously. This module will further analyze the images to determine whether the space under monitoring is occupied by an object. If the object is deemed a container, it then sends the image to the recognition module 56 to extract the container code. Otherwise, it ignores the image. In another embodiment, the image capturing module also detects the container type and the container length. In this case, the on-board computer does not need to rely on external sensing signal in its operation.

Although neural network technology is mentioned as a character recognizer in one embodiment, it is clear to those skilled in the art that other character recognition technologies can also be used in lieu of the neural network recognizer. Moreover, those skilled in the art can also choose different types of neural networks, and/or different network architectures such as different number of hidden layers, as well as number of nodes in each hidden layers.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

What is claimed is:

1. A system for determining container code comprising:
    at least one camera mounted on a container handler, said container handler hoisting or lowering a container;
    a computer system that is electrically coupled to said at least one camera; and
    electronic circuitry electrically coupled to said computer system;
    a motor attached to said container handler;
    a mobile support coupled to said motor;
    whereby when said cargo container is hoisted or lowered to a specific height, said computer system receives a trigger signal from said electronic circuitry to take a plurality of digital images from said at least one camera, extracts container recognition results from said plurality of digital images, and combines said results together to produce said container code, wherein said at least one camera is mounted on said mobile support so that said computer system commands said motor to move said at least one camera to a predefined position according to the length of said container being hoisted or lowered.

2. The system according to claim 1 wherein said at least one camera is mounted on a fixed extension arm; said fixed extension arm being attached to said container handler and said computer system enables one of said at least one camera to take said plurality of digital images according to the length of said container being hoisted or lowered.

3. The system according to claim 1, wherein said mobile support is a translational mobile support longitudinally traversing along the same direction of the side wall of said container being operated on; one end of said translational mobile support being coupled to said motor and the other end to said at least one camera; said motor providing a translational movement to said translational mobile support to position said camera assembly to a first position if said container being hoisted is a 20-foot container, and to a second position if said container is longer than 20 feet.

4. The system according to claim 1, wherein said mobile support comprises a rotary support, said camera assembly being coupled to said rotary support at a suitable vertical angle for capturing said container code; and said motor causing said rotary support to position said camera assembly to a first horizontal angle if said container being hoisted is a 20-foot container, and to a second horizontal angle if said container is longer than 20 feet.

5. The system according to claim 1 wherein said electronic circuitry is a programmable logic controller (PLC).

6. A system for determining container code comprising:
    at least one camera mounted on a container handler, said container handler hoisting or lowering a container;
    a computer system that is electrically coupled to said at least one camera; and
    electronic circuitry electrically coupled to said computer system;
    whereby when said cargo container is hoisted or lowered to a specific height, said computer system receives a trigger signal from said electronic circuitry to take a plurality of digital images from said at least one camera, extracts container recognition results from said plurality of digital images, and combines said results together to produce said container code, wherein said computer system further comprises a communication module, said communication module transmitting recognized results of said container code to a remote system.

* * * * *